US012718757B2

(12) United States Patent
Lim et al.

(10) Patent No.: US 12,718,757 B2
(45) **Date of Patent: *Aug. 25, 2026**

(54) DATA COMPENSATOR, DISPLAY DEVICE, AND METHOD OF DRIVING DISPLAY DEVICE

(71) Applicant: SAMSUNG DISPLAY CO., LTD., Yongin-si (KR)

(72) Inventors: Namjae Lim, Yongin-si (KR); Sungjae Park, Seongnam-si (KR); Seunghwan Park, Anyang-si (KR); Youngwoon Choi, Seoul (KR); Jinho Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 141 days.

This patent is subject to a terminal disclaimer.

(21) Appl. No.: 18/891,211

(22) Filed: Sep. 20, 2024

(65) Prior Publication Data

US 2025/0014517 A1 Jan. 9, 2025

Related U.S. Application Data

(63) Continuation of application No. 18/451,371, filed on Aug. 17, 2023, now Pat. No. 12,142,217, which is a (Continued)

(30) Foreign Application Priority Data

Nov. 19, 2021 (KR) ........................ 10-2021-0159909

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0842* (2013.01);

(Continued)

(58) Field of Classification Search
CPC ...... G09G 3/3233; G09G 3/2007; G09G 3/30; G09G 2300/0842; G09G 2300/0861;

(Continued)

(56) References Cited

U.S. PATENT DOCUMENTS 11,763,745 B2 9/2023 Lim et al.
2005/0110786 A1 5/2005 Inoue et al.

(Continued)

FOREIGN PATENT DOCUMENTS

KR 10-2016-0049073 A 5/2016
KR 10-2017-0088452 A 8/2017
KR 10-1954934 2/2019
KR 10-2020-0133044 11/2020
KR 10-2021-0107224 A 9/2021
KR 10-2021-0116834 9/2021

OTHER PUBLICATIONS

Notice of Allowance dated May 11, 2023 in corresponding U.S. Appl. No. 17/937,543.

(Continued)

*Primary Examiner* — Prabodh M Dharia
(74) *Attorney, Agent, or Firm* — F. CHAU & ASSOCIATES, LLC

(57) ABSTRACT

A display device includes a display panel including a plurality of pixels, a current sensor that senses a sensing current that flows through the pixels, and a data compensator. The data compensator calculates a target current from an image frame of input image data using a current deviation for each position of the image frame and a current contribution ratio for each color of the image frame, and that generates a scale factor by comparing the target current and the sensing current. The display device further includes a timing controller that generates output image data by scaling (Continued)

grayscale values of the input image data using the scale factor; and a data driver that provides a data signal corresponding to the output image data to the pixels.

24 Claims, 13 Drawing Sheets

Related U.S. Application Data continuation of application No. 17/937,543, filed on Oct. 3, 2022, now Pat. No. 11,763,745.

(52) U.S. Cl.
CPC ............... *G09G 2300/0861* (2013.01); *G09G 2310/027* (2013.01); *G09G 2310/08* (2013.01); *G09G 2320/0233* (2013.01); *G09G 2320/0242* (2013.01); *G09G 2320/041* (2013.01); *G09G 2320/0666* (2013.01)

(58) Field of Classification Search
CPC ......... G09G 2310/027; G09G 2310/08; G09G 2320/0233; G09G 2320/0242; G09G 2320/041; G09G 2320/0666; G09G 2320/0285; G09G 2320/0295; G09G 2320/0626; G09G 2320/0271; G09G 5/10; G09G 5/06; G09G 2360/16
USPC ..................................... 345/76, 83, 174, 691
See application file for complete search history.

(56) References Cited

U.S. PATENT DOCUMENTS

| | | | | |
|---|---|---|---|---|
| 2014/0160062 | A1* | 6/2014 | Kim | G02F 1/13338 345/174 |
| 2014/0168280 | A1* | 6/2014 | Lee | G09G 3/3208 345/76 |
| 2014/0354698 | A1* | 12/2014 | Lee | G09G 3/3258 345/690 |
| 2014/0354703 | A1* | 12/2014 | Han | G09G 3/3233 345/83 |
| 2016/0118022 | A1 | 4/2016 | Chun et al. | |
| 2016/0307490 | A1 | 10/2016 | Lee et al. | |
| 2017/0053587 | A1 | 2/2017 | Kim et al. | |
| 2019/0139490 | A1* | 5/2019 | Bang | G09G 3/2007 |
| 2019/0213949 | A1 | 7/2019 | Han | |
| 2019/0385534 | A1* | 12/2019 | Park | G09G 3/3275 |
| 2020/0365091 | A1 | 11/2020 | Pyun et al. | |
| 2021/0264838 | A1 | 8/2021 | Park et al. | |
| 2023/0162678 | A1 | 5/2023 | Lim et al. | |
| 2023/0402010 | A1 | 12/2023 | Lim et al. | |

OTHER PUBLICATIONS

Office Action dated Jan. 24, 2023 in corresponding U.S. Appl. No. 17/937,543.
Notice of Allowance dated Nov. 10, 2025 from the Korean Patent Office issued in corresponding Korean Patent Application No. 10-2021-0159909.

* cited by examiner

LUT2

| WT_CR | WT_CG | WT_CB |
|---|---|---|
| 424 | 294 | 305 |

DATA COMPENSATOR, DISPLAY DEVICE, AND METHOD OF DRIVING DISPLAY DEVICE

CROSS-REFERENCE TO RELATED APPLICATIONS

This application is a continuation of U.S. patent application Ser. No. 18/451,371 filed on Aug. 17, 2023, which is a continuation of U.S. patent application Ser. No. 17/937,543 filed on Oct. 3, 2022, which issued as U.S. Pat. No. 11,763,745 on Sep. 19, 2023, which claims priority under 35 U.S.C. § 119 to Korean Patent Application No. 10-2021-0159909 filed on Nov. 19, 2021 in the Korean Intellectual Property Office (KIPO), the disclosures of which are incorporated by reference herein in their entireties.

TECHNICAL FIELD

Embodiments of the present disclosure relate to a display device. More particularly, embodiments of the present disclosure related to a data compensator, a display device including the data compensator, and a method of driving the display device.

DISCUSSION OF RELATED ART

A display device may include a light emitting element that emits light. The light emitting element may be driven by current, voltage, etc. A display device including a light emitting element driven by a current may emit light having a luminance proportional to the current. The current of the display device may change according to a temperature of the display device. The temperature of the display device may change depending on, for example, an ambient temperature of the display device, heat generated by driving of the display device, etc. Accordingly, in the display device including the light emitting element driven by the current, an amount of change in luminance according to a change in temperature may be relatively large. For example, when the temperature of the display device decreases, the current of the display device may decrease, and accordingly, the luminance of the display device may decrease. Further, when the temperature of the display device increases, the current of the display device may increase, and accordingly, the luminance of the display device may increase.

SUMMARY

Embodiments of the present disclosure provide a data compensator that compensates a change in temperature, which may increase a display quality of a display device and a display device including the data compensator.

Embodiments provide a method of driving the display device.

A display device according to an embodiment includes a display panel including a plurality of pixels, a current sensor sensing a sensing current that flows through the pixels, a data compensator calculating a target current from an image frame of input image data using a current deviation for each position of the image frame and a current contribution ratio for each color of the image frame, and generating a scale factor by comparing the target current and the sensing current, a timing controller generating output image data by scaling grayscale values of the input image data using the scale factor, and a data driver providing a data signal corresponding to the output image data to the pixels.

In an embodiment, the data compensator includes a memory including a first look-up table that stores position weights related to the current deviation for each position of the image frame and a second look-up table that stores color weights related to the current contribution ratio for each color of the image frame, a target current calculator calculating the target current from the image frame using the position weights and the color weights, and a scale factor generator generating the scale factor by comparing the target current and the sensing current.

In an embodiment, the display panel is divided into blocks, each including at least one of the pixels. The position weights may correspond to the blocks, respectively.

In an embodiment, the position weights are ratios of currents that flow through the blocks to a reference current.

In an embodiment, the first look-up table stores first position weights related to a current deviation for each position of red data of the image frame, second position weights related to a current deviation for each position of green data of the image frame, and third position weights related to a current deviation for each position of blue data of the image frame.

In an embodiment, the second look-up table stores a first color weight related to a current contribution ratio of red data of the image frame, a second color weight related to a current contribution ratio of green data of the image frame, and a third color weight related to a current contribution ratio of blue data of the image frame.

In an embodiment, the data compensator calculates the target current from the image frame using a current efficiency for each grayscale of the image frame.

In an embodiment, the data compensator includes a memory including a first look-up table that stores position weights related to the current deviation for each position of the image frame, a second look-up table that stores color weights related to the current contribution ratio for each color of the image frame, and a third look-up table that stores grayscale weights related to the current efficiency for each grayscale of the image frame. The data compensator further includes a target current calculator calculating the target current from the image frame using the position weights, the color weights, and the grayscale weights, and a scale factor generator generating the scale factor by comparing the target current and the sensing current.

In an embodiment, the third look-up table stores grayscale weights related to a current efficiency for each grayscale of white data of the image frame.

In an embodiment, the third look-up table stores first grayscale weights related to a current efficiency of red data of the image frame, second grayscale weights related to a current efficiency of green data of the image frame, and third grayscale weights related to a current efficiency of blue data of the image frame.

In an embodiment, the grayscale weights are ratios of current efficiencies of grayscales to a current efficiency of a maximum grayscale.

In an embodiment, the sensing current is a global current flowing through the pixels based on the image frame.

A data compensator according to an embodiment includes a memory including a first look-up table that stores position weights related to a current deviation for each position of an image frame of input image data and a second look-up table that stores color weights related to the current contribution ratio for each color of the image frame, a target current calculator calculating a target current from the image frame using the position weights and the color weights, and a scale factor generator generating a scale factor by comparing the target current and a sensing current that flows through pixels of a display panel.

In an embodiment, the display panel is divided into blocks, each including at least one of the pixels. The position weights may correspond to the blocks, respectively.

In an embodiment, the first look-up table stores first position weights related to a current deviation for each position of red data of the image frame, second position weights related to a current deviation for each position of green data of the image frame, and third position weights related to a current deviation for each position of blue data of the image frame.

In an embodiment, the second look-up table stores a first color weight related to a current contribution ratio of red data of the image frame, a second color weight related to a current contribution ratio of green data of the image frame, and a third color weight related to a current contribution ratio of blue data of the image frame.

In an embodiment, the memory further includes a third look-up table that stores grayscale weights related to the current efficiency for each grayscale of the image frame. The target current calculator calculates the target current from the image frame further using the grayscale weights.

In an embodiment, the third look-up table stores grayscale weights related to a current efficiency for each grayscale of white data of the image frame.

In an embodiment, the third look-up table stores first grayscale weights related to a current efficiency of red data of the image frame, second grayscale weights related to a current efficiency of green data of the image frame, and third grayscale weights related to a current efficiency of blue data of the image frame.

A method of driving a display device according to an embodiment includes calculating a target current from an image frame of input image data using a current deviation for each position of the image frame and a current contribution ratio for each color of the image frame, generating a scale factor by comparing the target current and a sensing current that flows through pixels of a display panel, generating output image data by scaling grayscale values of the input image data using the scale factor, and providing a data signal corresponding to the output image data to the pixels.

In the data compensator, the display device, and the method of driving the display device according to embodiments of the present disclosure, the target current may be accurately calculated, so that the image data may be accurately compensated. Therefore, the display device may display an image in which a change in luminance according to a change in temperature may be compensated, and accordingly, display quality of the display device may be increased.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
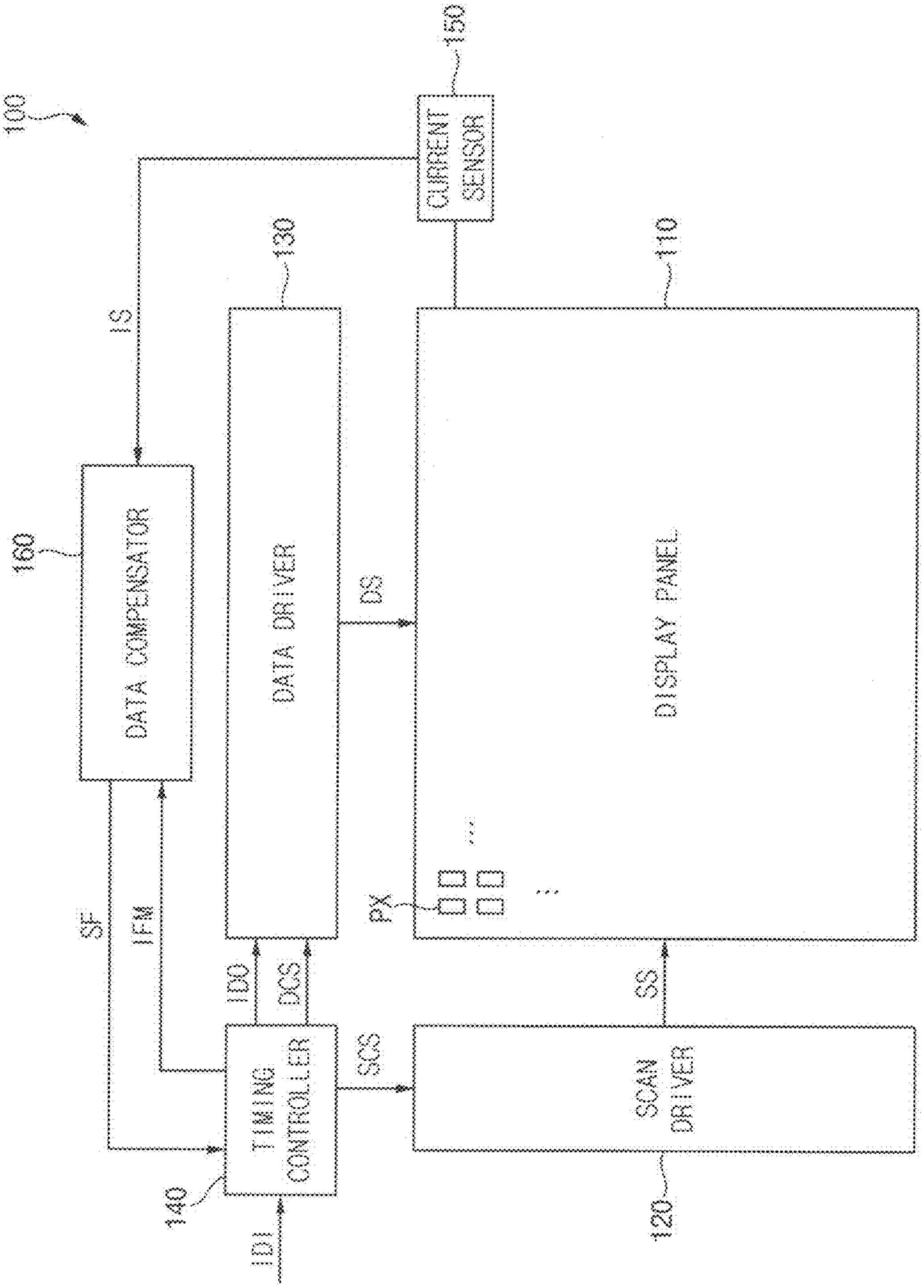
FIG. 1 is a block diagram illustrating a display device according to an embodiment.

Hereinafter, data compensators, display devices, and methods of driving display devices in accordance with embodiments will be described in detail with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when one value is described as being about equal to another value or being substantially the same as or equal to another value, it is to be understood that the values are identical, the values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

FIG. 1 is a block diagram illustrating a display device 100 according to an embodiment.

Referring to FIG. 1, the display device 100 may include a display panel 110, a scan driver 120, a data driver 130, a timing controller 140, a current sensor 150, and a data compensator 160. The scan driver 120 may also be referred to as a scan driver circuit, the data driver 130 may also be referred to as a data driver circuit, the timing controller 140 may also be referred to as a timing controller circuit, the current sensor 150 may also be referred to as a current sensor circuit, and the data compensator 160 may also be referred to as a data compensator circuit.

The display panel 110 may display an image. The display panel 110 may include a plurality of pixels PX. The pixels PX may be arranged in a substantially matrix form, and accordingly, the pixels PX may define pixel rows and pixel columns. Pixels PX may emit light, and the display panel 110 may display an image in which the emitted light from the pixels PX is combined. In an embodiment, each of the pixels PX may emit at least one of red, green, blue, and white light.

The scan driver 120 may generate a scan signal SS based on a scan control signal SCS. The scan driver 120 may provide the scan signal SS to the pixels PX. The scan driver 120 may sequentially provide the scan signal SS to the pixel rows. In an embodiment, the scan driver 120 may be formed on the display panel 110 in the form of a circuit.

The data driver 130 may generate a data signal DS based on a data control signal DCS and output image data IDO. The data driver 130 may generate the data signal DS corresponding to the output image data IDO. The data driver 130 may provide the data signal DS to the pixels PX. The data driver 130 may provide the data signal DS to the pixel row selected by the scan signal SS. In an embodiment, the data driver 130 may be mounted in the form of a driving chip on the display panel 110 or on a circuit board electrically connected to the display panel 110.

The timing controller 140 may control driving of the scan driver 120. The timing controller 140 may generate the scan control signal SCS based on a control signal. The control signal may include, for example, a clock signal, a horizontal synchronization signal, and a vertical synchronization signal. The timing controller 140 may provide the scan control signal SCS to the scan driver 120.

The timing controller 140 may control driving of the data driver 130. The timing controller 140 may generate the data control signal DCS and the output image data IDO based on the control signal, input image data IDI, and a scale factor SF. The timing controller 140 may provide the data control signal DCS and the output image data IDO to the data driver 130.

The timing controller 140 may generate the output image data IDO by scaling grayscale values of the input image data IDI using the scale factor SF. When the scale factor SF is greater than 1, the timing controller 140 may generate the output image data IDO by increasing the grayscale values of the input image data IDI. When the scale factor SF is less than 1, the timing controller 140 may generate the output image data IDO by decreasing the grayscale values of the input image data IDI.

The timing controller 140 may provide an image frame IFM of the input image data IDI to the data compensator 160. The image frame IFM may include at least one of a plurality of image frames included in the input image data IDI. In an embodiment, the image frame IFM may include one of image frames included in the input image data IDI.

In an embodiment, the timing controller 140 may be mounted in the form of a driving chip on the display panel 110 or on a circuit board electrically connected to the display panel 110.

The current sensor 150 may sense a sensing current IS flowing through the pixels PX. The sensing current IS may be a global current that is a sum of currents respectively flowing through the pixels PX. The current sensor 150 may provide the sensing current IS to the data compensator 160.

In an embodiment, the sensing current IS may be a global current flowing through the pixels PX based on the image frame IFM. For example, when the data driver 130 generates the data signal DS corresponding to the image frame IFM and provides the data signal DS to the pixels PX, the current sensor 150 may sense the global current flowing through the pixels PX. The sensing current IS may include not only a current based on the image frame IFM, but also a current based on a change in temperature due to an ambient temperature of the display device 100, heat generated by driving of the display device 100, etc.

Figure 2:
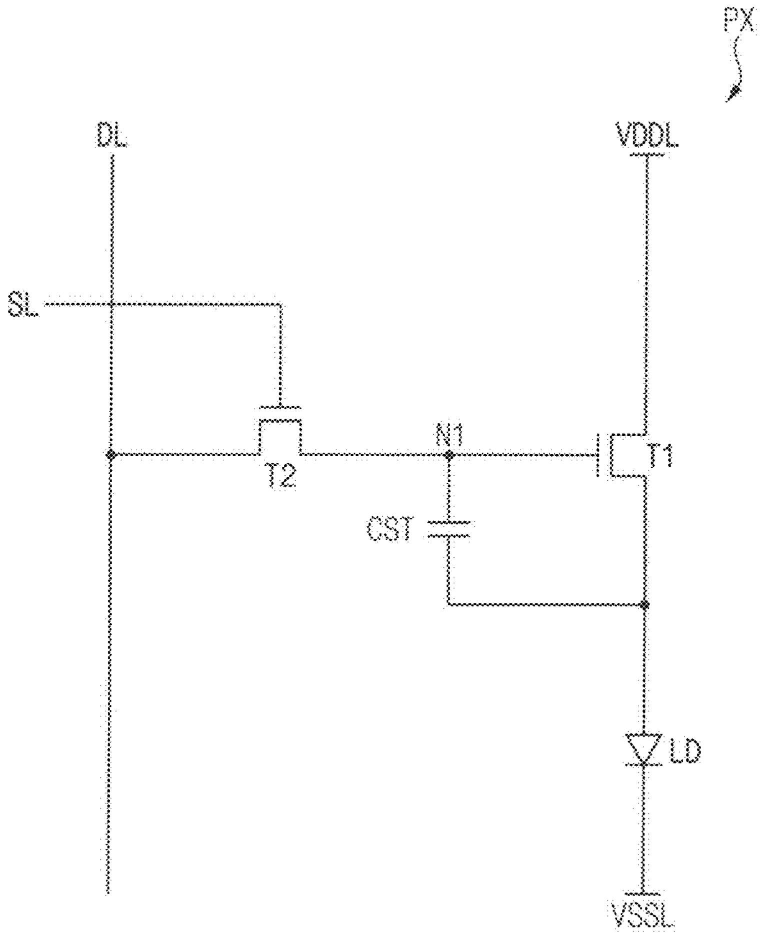
FIG. 2 is a circuit diagram illustrating a pixel included in the display device in FIG. 1 according to an embodiment.

In an embodiment, the current sensor 150 may sense a global current flowing through at least one of a first power line VDDL in FIG. 2 and a second power line VSSL in FIG. 2. For example, when the first power line VDDL is commonly connected to all the pixels PX, the sensing current IS may be a current commonly applied to all the pixels PX through the first power line VDDL.

The data compensator 160 may calculate a target current IT in FIG. 2 from the image frame IFM. The target current IT may be a current flowing through the pixels PX calculated based on the image frame IFM. The target current IT may include only a current based on the image frame IFM. The data compensator 160 may calculate the target current IT from the image frame IFM using at least one of a current deviation for each position of the image frame IFM, a current contribution ratio for each color of the image frame IFM, and a current efficiency for each grayscale of the image frame IFM.

In an embodiment, the data compensator 160 may calculate the target current IT from the image frame IFM using one of the current deviation for each position of the image frame IFM, the current contribution ratio for each color of the image frame IFM, and the current efficiency for each grayscale of the image frame IFM. In an embodiment, the data compensator 160 may calculate the target current IT from the image frame IFM using two of the current deviation for each position of the image frame IFM, the current contribution ratio for each color of the image frame IFM, and the current efficiency for each grayscale of the image frame IFM. In an embodiment, the data compensator 160 may calculate the target current IT from the image frame IFM using all of the current deviation for each position of the image frame IFM, the current contribution ratio for each color of the image frame IFM, and the current efficiency for each grayscale of the image frame IFM.

The data compensator 160 may generate the scale factor SF by comparing the target current IT and the sensing current IS. The data compensator 160 may provide the scale factor SF to the timing controller 140.

In an embodiment, the data compensator 160 may be implemented in the form of a driving chip together with the timing controller 140. In an embodiment, the data compensator 160 may be implemented in the form of a driving chip separate from the timing controller 140.

The data compensator 160 may generate the scale factor SF by comparing the target current IT and the sensing current IS, the timing controller 140 may generate the output image data IDO by scaling the grayscale values of the input image data IDI using the scale factor SF, and the data driver 130 may provide the data signal DS corresponding to the output image data IDO to the pixels PX. The process of controlling a driving current of each of the pixels PX may be referred to as global current management (GCM).

FIG. 2 is a circuit diagram illustrating the pixel PX included in the display device 100 in FIG. 1 according to an embodiment.

Referring to FIGS. 1 and 2, in an embodiment, the pixel PX may include a first transistor T1, a second transistor T2, a storage capacitor CST, and a light emitting element LD.

A first electrode of the first transistor T1 may be connected to the first power line VDDL, and a second electrode of the first transistor T1 may be connected to a first electrode of the light emitting element LD. A gate electrode of the first transistor T1 may be connected to a first node N1. The first transistor T1 may be referred to as a driving transistor.

A first electrode of the second transistor T2 may be connected to a data line DL that transmits the data signal DS, and a second electrode of the second transistor T2 may be connected to the first node N1. A gate electrode of the second transistor T2 may be connected to a scan line SL that transmits the scan signal SS. The second transistor T2 may be referred to as a switching transistor or a scan transistor.

In an embodiment, as illustrated in FIG. 2, each of the first transistor T1 and the second transistor T2 may be an N-type transistor. In an embodiment, at least one of the first transistor T1 and the second transistor T2 may be a P-type transistor.

A first electrode of the storage capacitor CST may be connected to the first node N1, and a second electrode of the storage capacitor CST may be connected to the second electrode of the first transistor T1.

A first electrode of the light emitting element LD may be connected to the second electrode of the first transistor T1, and a second electrode of the light emitting element LD may be connected to the second power line VSSL. In an embodiment, the light emitting element LD may be an organic light emitting diode. In an embodiment, the light emitting element LD may be an inorganic light emitting diode or a quantum dot light emitting diode.

When the scan signal SS of a turn-on level (e.g., a high level) is applied to the scan line SL, the second transistor T2 may be turned on. In this case, the data signal DS applied to the data line DL may be transmitted to the first node N1, and the data signal DS may be stored in the storage capacitor CST.

A driving current corresponding to a voltage difference between the first electrode and the second electrode of the storage capacitor CST may flow between the first electrode and the second electrode of the first transistor T1. The light emitting element LD may emit light with a luminance corresponding to the driving current applied from the first transistor T1.

Then, when the scan signal SS of a turn-off level (e.g., a low level) is applied to the scan line SL, the second transistor T2 may be turned off. Accordingly, in an embodiment, the data line DL and the first electrode of the storage capacitor CST may be electrically separated, and the voltage stored in the storage capacitor CST does not change even if the data signal DS is changed.

FIG. 2 illustrates an embodiment in which the pixel PX includes two transistors and one capacitor. However, embodiments of the present disclosure are not limited thereto. In an embodiment, the pixel PX may further include an emission control transistor turned on in response to an emission control signal to electrically connect the second electrode of the first transistor T1 and the first electrode of the light emitting element LD. In an embodiment, the pixel PX may further include a sensing transistor turned on in response to a sensing signal to sense a voltage or current applied to the second electrode of the first transistor T1 or the first electrode of the light emitting element LD.

The sensing current IS sensed by the current sensor 150 may be the sum of all driving currents flowing through the first transistors T1 of the pixels PX. In this case, the driving current of each of the pixels PX may be determined by the data signal DS, and the data signal DS may be a signal corresponding to the image frame IFM.

Figure 3:
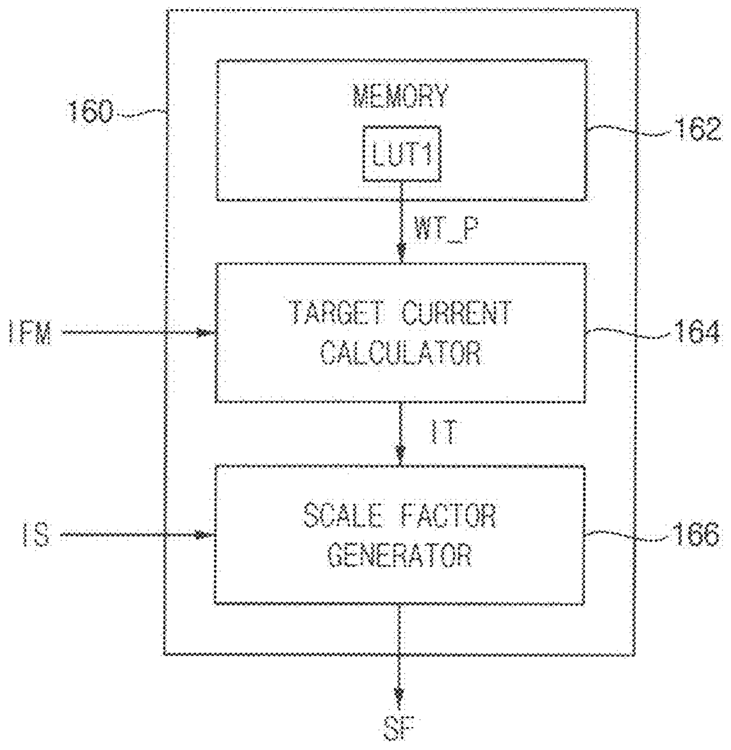
FIG. 3 is a block diagram illustrating a data compensator according to an embodiment.

FIG. 3 is a block diagram illustrating a data compensator 160 according to an embodiment.

Referring to FIG. 3, the data compensator 160 may include a memory 162, a target current calculator 164, and a scale factor generator 166. The target current calculator 164 may also be referred to as a target current calculator circuit, and the scale factor generator 166 may also be referred to as a scale factor generator circuit.

The memory 162 may include a first look-up table LUT1.

The first look-up table LUT1 may store position weights WT_P related to a current deviation for each position of the image frame IFM. Deviations in characteristics of the pixels PX may occur due to, for example, process deviation occurring during a manufacturing process of the display device 100. Accordingly, even though the same data signal DS is applied to the pixels PX, currents flowing through the pixels PX may be different for each position. Accordingly, to reflect different current deviation for each position in the calculation of the target current IT, the first look-up table LUT1 may store different position weights WT_P for each position. The position weights WT_P may be stored in the first look-up table LUT1 through, for example, measurement based on test data during the manufacturing process of the display device 100.

The target current calculator 164 may calculate the target current IT from the image frame IFM using the position weights WT_P. The target current calculator 164 may receive the position weights WT_P corresponding to position information of the image frame IFM from the first look-up table LUT1. In an embodiment, the target current calculator 164 may calculate the target current IT by multiplying the grayscale values of the image frame IFM by the position weights WT_P.

The scale factor generator 166 may generate the scale factor SF by comparing the target current IT and the sensing current IS. In an embodiment, the scale factor generator 166 may determine a ratio of the target current IT to the sensing current IS as the scale factor SF. For example, the scale factor generator 166 may generate a scale factor SF less than 1 when the target current IT is less than the sensing current IS, and may generate a scale factor SF greater than one when the target current IT is greater than the sensing current IS.

As described above, the target current IT may include only the current based on the image frame IFM, and the sensing current IS may include not only the current based on the image frame IFM but also the current based on change in temperature due to, for example, the ambient temperature of the display device 100, heat generated by driving of the display device 100, etc. The scale factor generator 166 may generate the scale factor SF that is the ratio of the target current IT to the sensing current IS, and the timing controller 140 may generate the output image data IDO by scaling the grayscale values of the input image data IDI using the scale factor SF, so that the output image data IDO for which the change in temperature is compensated may be provided to the data driver 130.

Figure 4:
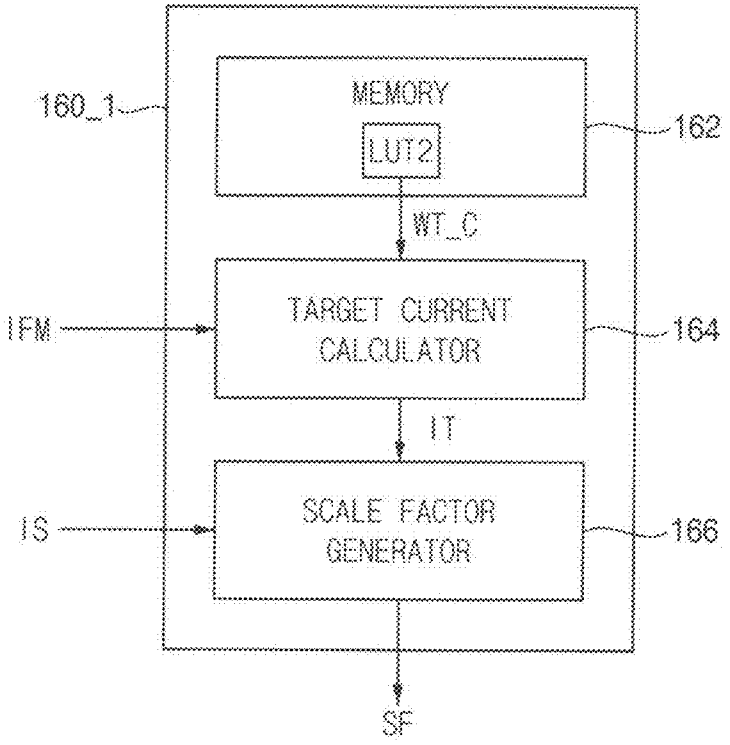
FIG. 4 is a block diagram illustrating a data compensator according to an embodiment.

FIG. 4 is a block diagram illustrating a data compensator 160_1 according to an embodiment.

Referring to FIG. 4, the data compensator 160_1 may include a memory 162, a target current calculator 164, and a scale factor generator 166. For convenience of explanation, descriptions of elements of the data compensator 160_1 described with reference to FIG. 4, which are substantially the same as or similar to those of the data compensator 160 described with reference to FIG. 3, will be omitted.

The memory 162 may include a second look-up table LUT2.

The second look-up table LUT2 may store color weights WT_C related to a current contribution ratio for each color of the image frame IFM. Characteristics of the light emitting elements LD that emit light of different colors may be different. For example, characteristics of the light emitting element LD emitting red light, characteristics of the light emitting element LD emitting green light, and characteristics of the light emitting element LD emitting blue light may be different. Accordingly, even though the same data signal DS is applied to the pixels PX, currents flowing through the pixels PX may be different for each color. Accordingly, to reflect different current contribution ratio for each color in the calculation of the target current IT, the second look-up table LUT2 may store different color weights WT_C for each color. The color weights WT_C may be stored in the second look-up table LUT2 through measurement based on, for example, test data during the manufacturing process of the display device 100.

The target current calculator 164 may calculate the target current IT from the image frame IFM using the color weights WT_C. The target current calculator 164 may receive the color weights WT_C corresponding to color information of the image frame IFM from the second look-up table LUT2. In an embodiment, the target current calculator 164 may calculate the target current IT by multiplying the grayscale values of the image frame IFM by the color weights WT_C.

Figure 5:
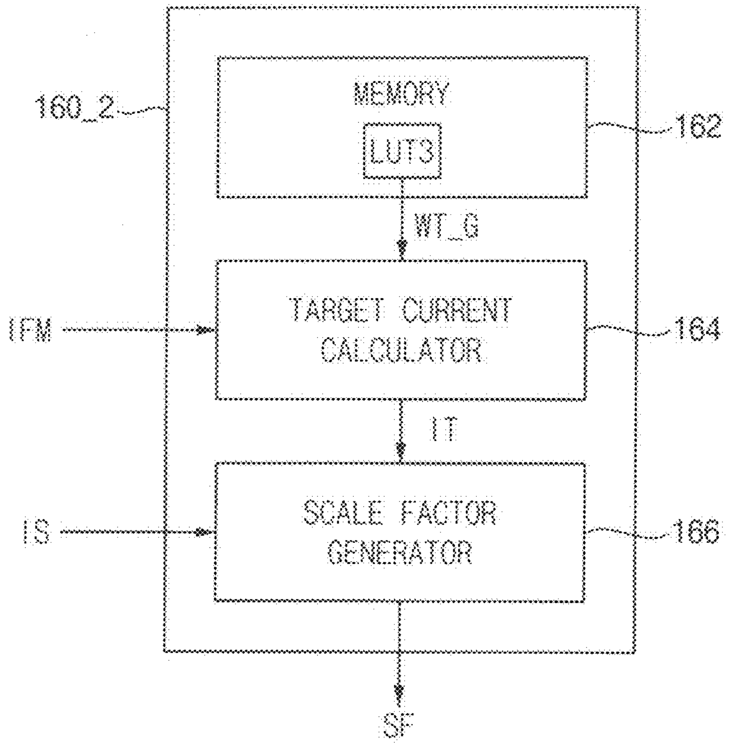
FIG. 5 is a block diagram illustrating a data compensator according to an embodiment.

FIG. 5 is a block diagram illustrating a data compensator 160_2 according to an embodiment.

Referring to FIG. 5, the data compensator 160_2 may include a memory 162, a target current calculator 164, and a scale factor generator 166. For convenience of explanation, descriptions of elements of the data compensator 160_2 described with reference to FIG. 5, which are substantially the same as or similar to those of the data compensator 160 described with reference to FIG. 3, will be omitted.

The memory 162 may include a third look-up table LUT3.

The third look-up table LUT3 may store grayscale weights WT_G related to a current efficiency for each grayscale of the image frame IFM. Although the current of the display panel 110 and the luminance of the display panel 110 are generally in direct proportion, a ratio of the current of the display panel 110 to the luminance of the display panel 110 may be different for each grayscale. For example, as the grayscale decreases, a ratio of current to luminance (or a current efficiency) may decrease. Accordingly, to reflect different current efficiency for each grayscale in the calculation of the target current IT, the third look-up table LUT3 may store different grayscale weights WT_G for each grayscale. The grayscale weights WT_G may be stored in the third look-up table LUT3 through measurement based on test data during the manufacturing process of the display device 100 etc.

The target current calculator 164 may calculate the target current IT from the image frame IFM using the grayscale weights WT_G. The target current calculator 164 may receive the grayscale weights WT_G corresponding to grayscale information of the image frame IFM from the third look-up table LUT3. In an embodiment, the target current calculator 164 may calculate the target current IT by multiplying the grayscale values of the image frame IFM by the grayscale weights WT_G.

Figure 6:
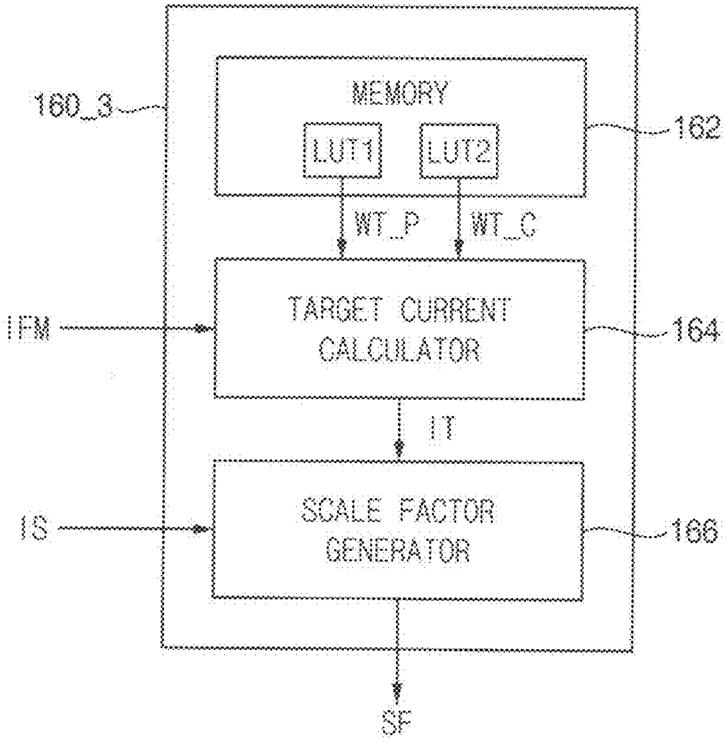
FIG. 6 is a block diagram illustrating a data compensator according to an embodiment.

FIG. 6 is a block diagram illustrating a data compensator 160_3 according to an embodiment.

Referring to FIG. 6, the data compensator 160_3 may include a memory 162, a target current calculator 164, and a scale factor generator 166. For convenience of explanation, descriptions of elements of the data compensator 160_3 described with reference to FIG. 6, which are substantially the same as or similar to those of the data compensator 160 described with reference to FIG. 3 and those of the data compensator 160_1 described with reference to FIG. 4, will be omitted.

The memory 162 may include a first look-up table LUT1 and a second look-up table LUT2.

The target current calculator 164 may calculate the target current IT from the image frame IFM using the position weights WT_P and the color weights WT_C. The target current calculator 164 may receive the position weights WT_P corresponding to position information of the image frame IFM from the first look-up table LUT1, and may receive the color weights WT_C corresponding to color information of the image frame IFM from the second look-up table LUT2. In an embodiment, the target current calculator 164 may calculate the target current IT by multiplying the grayscale values of the image frame IFM by the position weights WT_P and the color weights WT_C.

Figure 7:
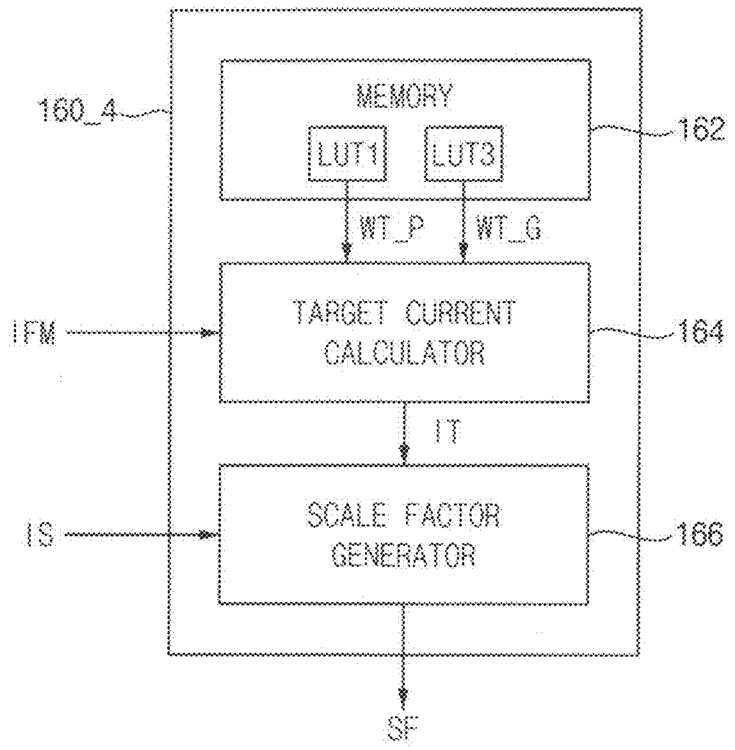
FIG. 7 is a block diagram illustrating a data compensator according to an embodiment.

FIG. 7 is a block diagram illustrating a data compensator 160_4 according to an embodiment.

Referring to FIG. 7, the data compensator 160_4 may include a memory 162, a target current calculator 164, and a scale factor generator 166. For convenience of explanation, descriptions of elements of the data compensator 160_4 described with reference to FIG. 7, which are substantially the same as or similar to those of the data compensator 160 described with reference to FIG. 3 and those of the data compensator 160_2 described with reference to FIG. 5, will be omitted.

The memory 162 may include a first look-up table LUT1 and a third look-up table LUT3.

The target current calculator 164 may calculate the target current IT from the image frame IFM using the position weights WT_P and the grayscale weights WT_G. The target current calculator 164 may receive the position weights WT_P corresponding to position information of the image frame IFM from the first look-up table LUT1, and may receive the grayscale weights WT_G corresponding to grayscale information of the image frame IFM from the third look-up table LUT3. In an embodiment, the target current calculator 164 may calculate the target current IT by multiplying the grayscale values of the image frame IFM by the position weights WT_P and the grayscale weights WT_G.

Figure 8:
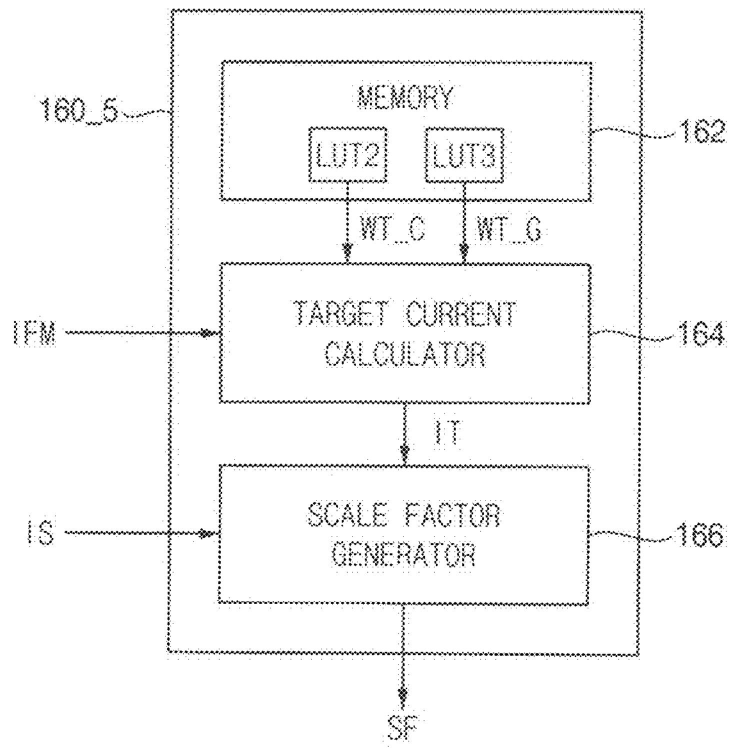
FIG. 8 is a block diagram illustrating a data compensator according to an embodiment.

FIG. 8 is a block diagram illustrating a data compensator 160_5 according to an embodiment.

Referring to FIG. 8, the data compensator 160_5 may include a memory 162, a target current calculator 164, and a scale factor generator 166. For convenience of explanation, descriptions of elements of the data compensator 160_5 described with reference to FIG. 8, which are substantially the same as or similar to those of the data compensator 160_1 described with reference to FIG. 4 and those of the data compensator 160_2 described with reference to FIG. 5, will be omitted.

The memory 162 may include a second look-up table LUT2 and a third look-up table LUT3.

The target current calculator 164 may calculate the target current IT from the image frame IFM using the color weights WT_C and the grayscale weights WT_G. The target current calculator 164 may receive the color weights WT_C corresponding to color information of the image frame IFM from the second look-up table LUT2, and may receive the grayscale weights WT_G corresponding to grayscale information of the image frame IFM from the third look-up table LUT3. In an embodiment, the target current calculator 164 may calculate the target current IT by multiplying the grayscale values of the image frame IFM by the color weights WT_C and the grayscale weights WT_G.

Figure 9:
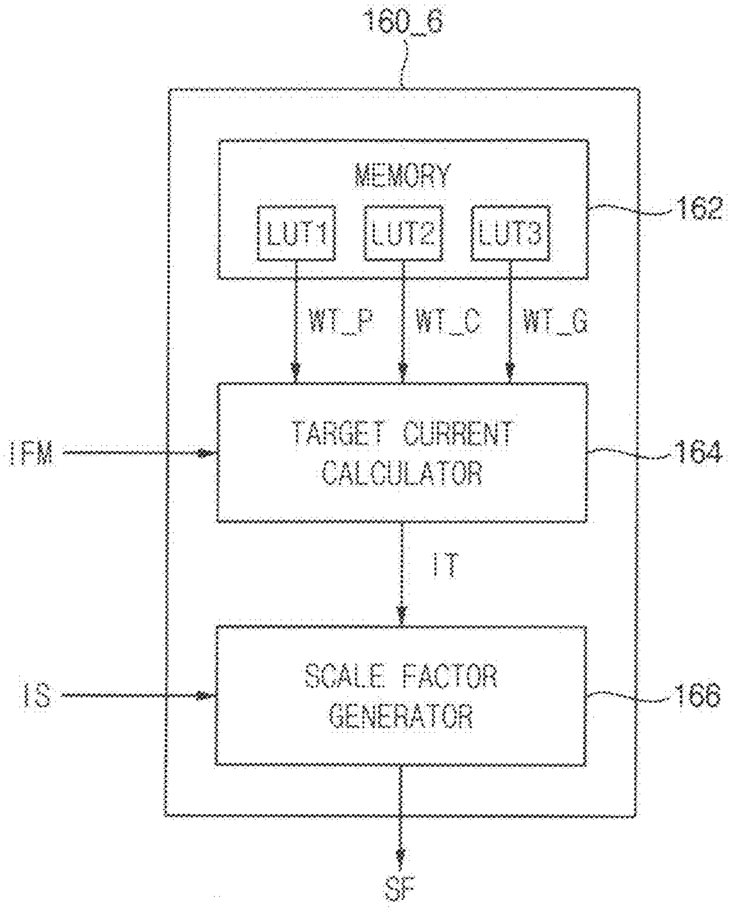
FIG. 9 is a block diagram illustrating a data compensator according to an embodiment.

FIG. 9 is a block diagram illustrating a data compensator 160_6 according to an embodiment.

Referring to FIG. 9, the data compensator 160_6 may include a memory 162, a target current calculator 164, and a scale factor generator 166. For convenience of explanation, descriptions of elements of the data compensator 160_6 described with reference to FIG. 9, which are substantially the same as or similar to those of the data compensator 160 described with reference to FIG. 3, those of the data compensator 160_1 described with reference to FIG. 4, and those of the data compensator 160_2 described with reference to FIG. 5, will be omitted.

The memory 162 may include a first look-up table LUT1, a second look-up table LUT2, and a third look-up table LUT3.

The target current calculator 164 may calculate the target current IT from the image frame IFM using the position weights WT_P, the color weights WT_C, and the grayscale weights WT_G. The target current calculator 164 may receive the position weights WT_P corresponding to position information of the image frame IFM from the first look-up table LUT1, may receive the color weights WT_C corresponding to color information of the image frame IFM from the second look-up table LUT2, and may receive the grayscale weights WT_G corresponding to grayscale information of the image frame IFM from the third look-up table LUT3. In an embodiment, the target current calculator 164 may calculate the target current IT by multiplying the grayscale values of the image frame IFM by the position weights WT_P, the color weights WT_C, and the grayscale weights WT_G.

Figure 10:
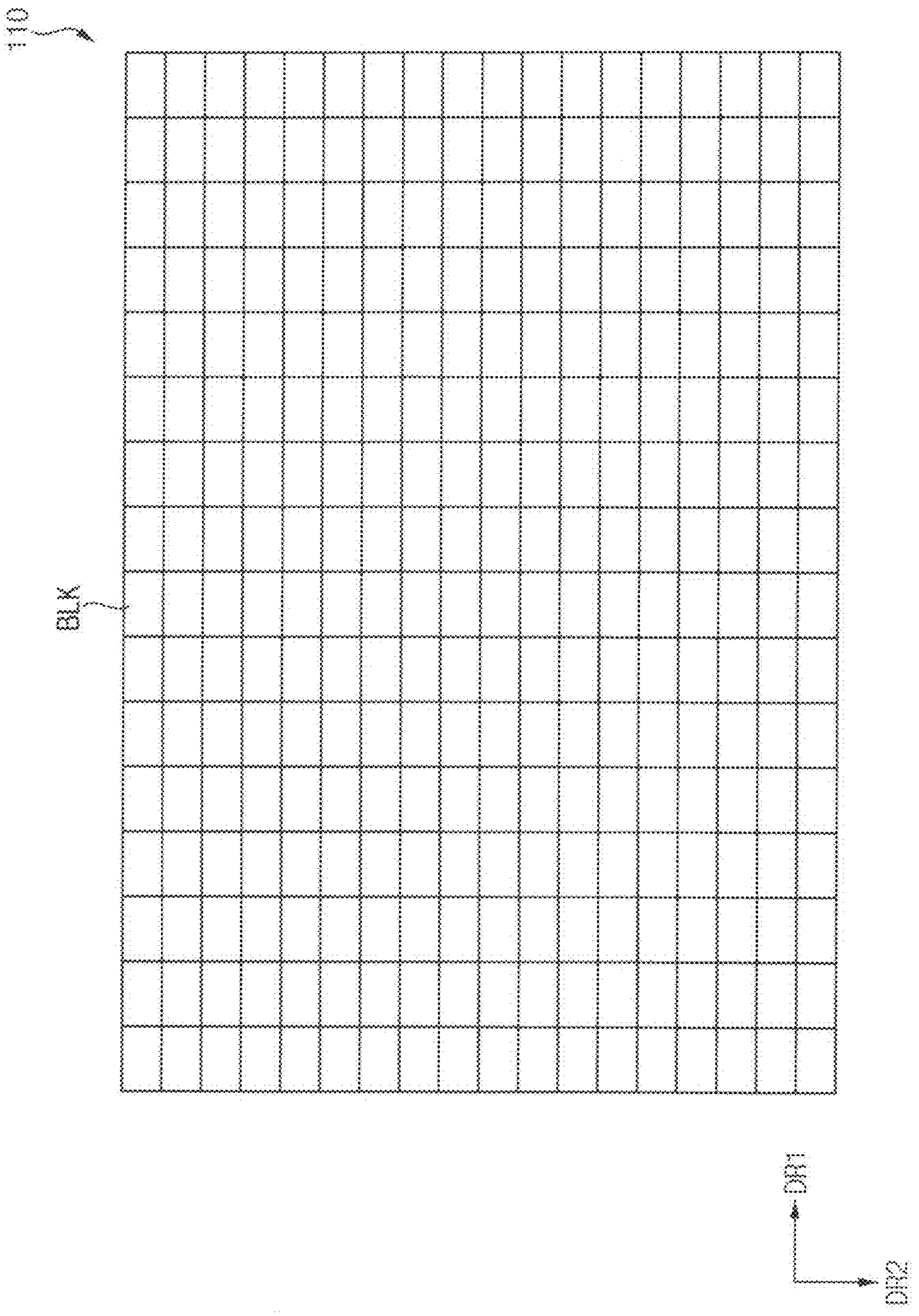
FIG. 10 is a plan view illustrating a display panel included in the display device in FIG. 1 according to an embodiment.
Figure 11:
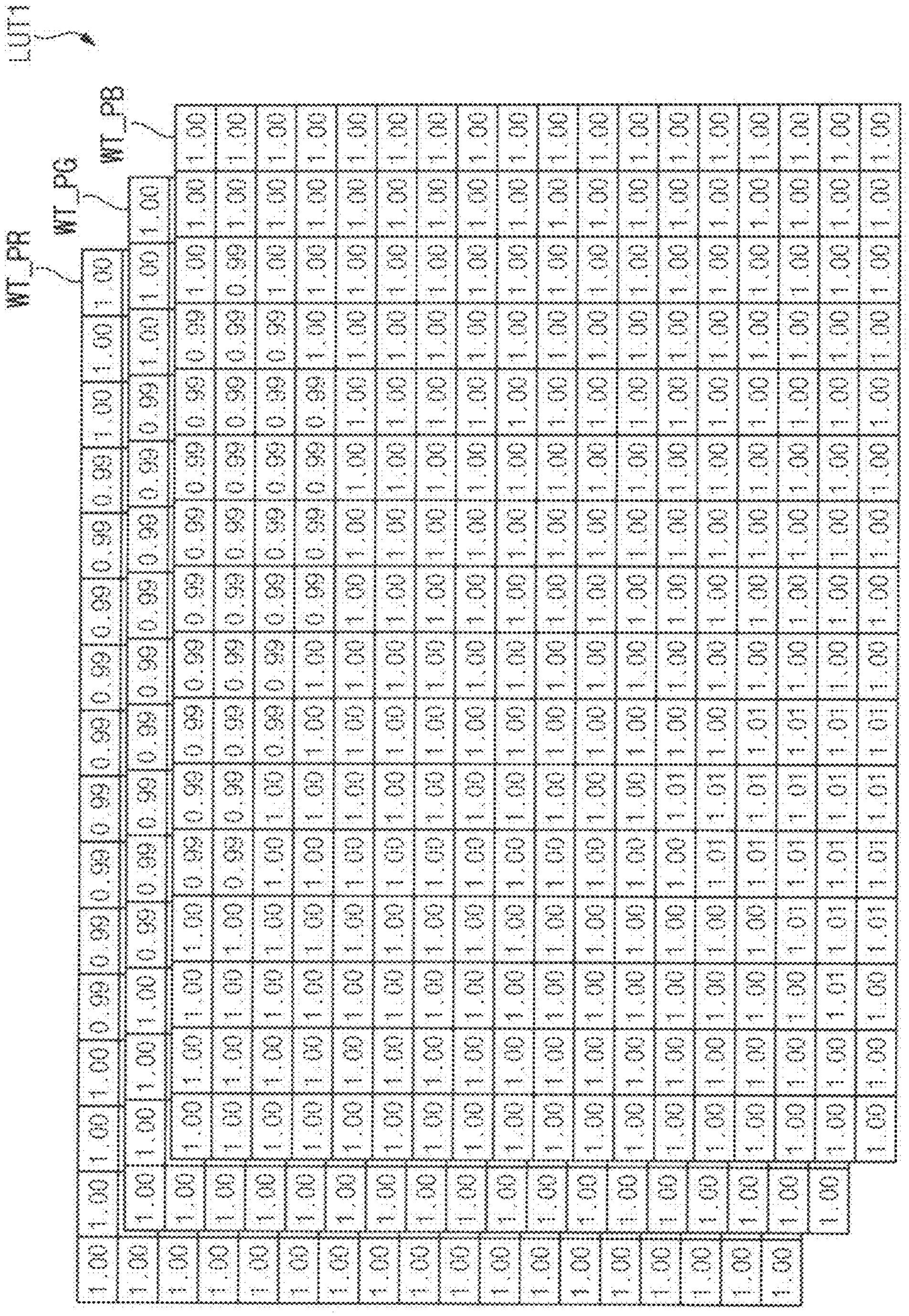
FIG. 11 is a diagram illustrating a first look-up table according to an embodiment.
Figure 12:
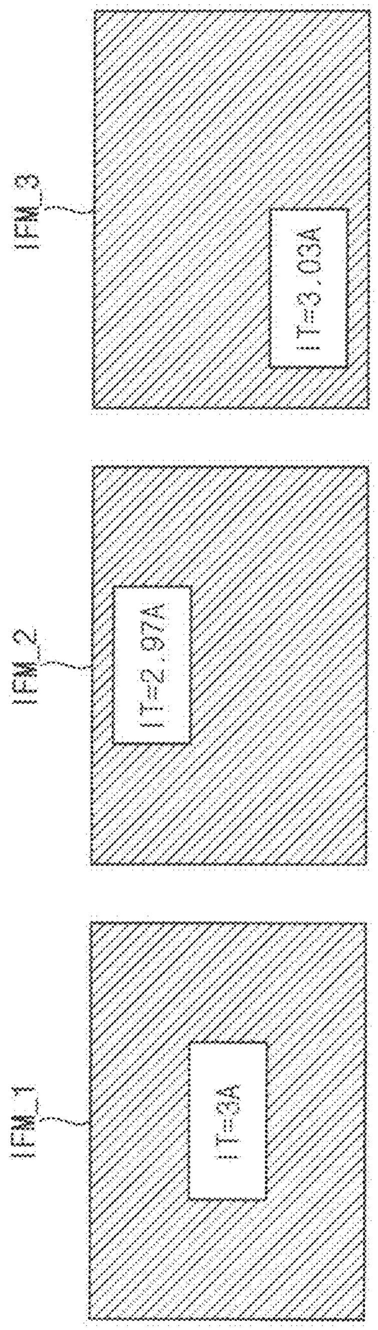
FIG. 12 is a diagram for describing target currents based on image frames according to an embodiment.

FIG. 10 is a plan view illustrating the display panel 110 included in the display device 100 in FIG. 1 according to an embodiment. FIG. 11 is a diagram illustrating the first look-up table LUT1 according to an embodiment. FIG. 12 is a diagram for describing target currents IT based on image frames IFM_1, IFM_2, and IFM 3.

Referring to FIGS. 3, 6, 7, 9, 10, 11, and 12, the display panel 110 may be divided into a plurality of blocks BLK. Each of the blocks BLK may include at least one pixel PX in FIG. 1.

FIG. 10 illustrates an embodiment in which the display panel 110 is divided into 16 blocks BLK in a first direction DR1 and divided into 18 blocks BLK in a second direction DR2 crossing the first direction DR1, however, embodiments of the present disclosure are not limited thereto. For example, in an embodiment, the display panel 110 may be divided into 2 to 15 or 17 or more blocks BLK in the first direction DR1, and divided into 2 to 17 or 19 blocks BLK in the second direction DR2.

The number of blocks BLK may be determined in consideration of accuracy and cost of the global current management (GCM). When the number of blocks BLK increases, the accuracy of the global current management GCM may increase as the number of position weights WT_P increases, however, the cost of the global current management (GCM) may also increase as the size of the look-up table LUT1 for storing the position weights WT_P increases. When the number of blocks BLK decreases, the cost of the global current management (GCM) may decrease, however, the accuracy of the global current management (GCM) may also decrease.

The position weights WT_P may respectively correspond to the blocks BLK. For example, the number of position weights WT_P may be equal to the number of blocks BLK, and the position weight WT_P may be determined for each block BLK.

In an embodiment, the position weights WT_P may be a ratio of currents flowing through the blocks BLK to a reference current. For example, the reference current may be an average value, a median value, or a representative value of the currents flowing through the blocks BLK. When a current flowing through one block BLK is greater than the reference current, the position weight WT_P corresponding to the block BLK may be greater than 1. When a current flowing through one block BLK is less than the reference current, the position weight WT_P corresponding to the block BLK may be less than 1.

In an embodiment, the first look-up table LUT1 may store first position weights WT_PR related to a current deviation for each position of red data of the image frame IFM, second position weights WT_PG related to a current deviation for each position of green data of the image frame IFM, and third position weights WT_PB related to a current deviation for each position of blue data of the image frame IFM. For example, the target current calculator 164 may add values obtained by multiplying grayscale values of the red data by the first position weights WT_PR, values obtained by multiplying grayscale values of the green data by the second position weights WT_PG, and values obtained by multiplying grayscale values of the blue data by the third position weights WT_PB to calculate the target current IT based on the image frame IFM including the red data, the green data, and the blue data.

As illustrated in FIG. 12, as the position weights WT_P are different for each block BLK, target currents IT based on different image frames IFM_1, IFM_2, and IFM_3 may be different from each other. A target current IT based on an image frame IFM_3 including blocks BLK corresponding to relatively large position weights WT_P (through which a current greater than the reference current flows) may be greater than a target current IT based on an image frame IFM_1 including blocks BLK corresponding to average position weights WT_P (through which the reference current flows). Further, a target current IT based on an image frame IFM_2 including the blocks BLK corresponding to relatively small position weights WT_P (through which a current less than the reference current flows) may be less than the target current IT based on the image frame IFM_1 including the blocks BLK corresponding to the average position weights WT_P (through which the reference current flows).

Figures 13, 14:
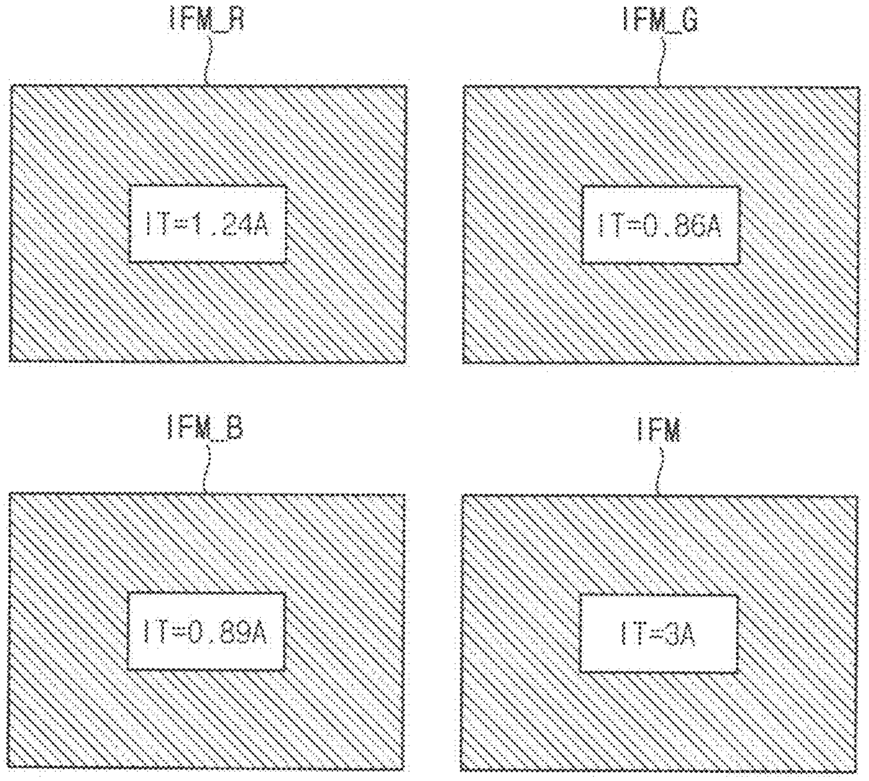
FIG. 13 is a diagram for describing a second look-up table according to an embodiment.
FIG. 14 is a diagram for describing target currents according to color data of an image frame according to an embodiment.

FIG. 13 is a diagram illustrating the second look-up table LUT2 according to an embodiment. FIG. 14 is a diagram for describing target currents IT according to color data IFM_R, IFM_G, and IFM_B of an image frame according to an embodiment.

Referring to FIGS. 4, 6, 8, 9, 13, and 14, in an embodiment, the second look-up table LUT2 may store a first color weight WT_CR related to a current contribution ratio of red data IFM R of the image frame IFM, a second color weight WT_CG related to a current contribution ratio of green data IFM_G of the image frame IFM, and a third color weight WT_CB related to a current contribution ratio of blue data IFM_B of the image frame IFM. For example, the first color weight WT_CR may be 424, the second color weight WT_CG may be 294, and the third color weight WT_CB may be 305. In this case, contribution ratio of the red data IFM_R, the green data IFM G, and the blue data IFM_B to the target current IT based on the image frame IFM may be 424:294:305

As illustrated in FIG. 14, as the color weights WT_C are different for each color, a target current IT based on the red data IFM_R of the image frame IFM, a target current IT based on the green data IFM_G of the image frame IFM, and a target current IT based on the blue data IFM_B of the image frame IFM may be different from each other. For example, the target current IT based on the red data IFM_R may be about 1.24 A, the target current IT based on the green data IFM_G may be about 0.86 A, and the target current IT based on the blue data IFM_B may be about 0.89 A. The target current calculator 164 may add the target current IT based on the red data IFM_R, the target current IT based on the green data IFM_G, and the target current IT based on the blue data IFM_B to calculate the target current IT based on the image frame IFM including the red data IFM_R, the green data IFM_G, and the blue data IFM_B. In the above example, the target current IT based on the image frame IFM may be calculated to be about 3 A.

Figure 15:
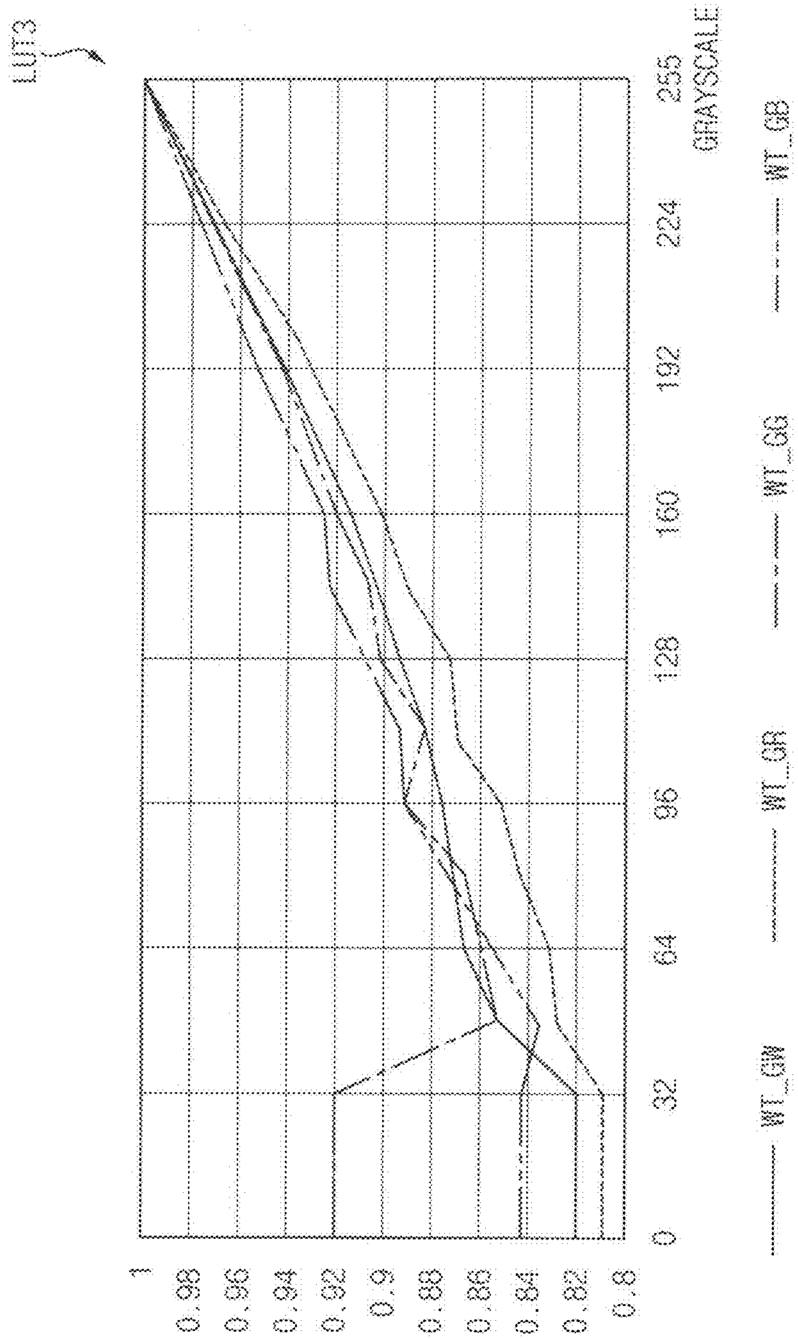
FIG. 15 is a diagram illustrating a third look-up table according to an embodiment.

FIG. 15 is a diagram illustrating the third look-up table LUT3 according to an embodiment.

Referring to FIGS. 5, 7, 8, 9, and 15, the third look-up table LUT3 may store grayscale weights WT_G for compensating for a different ratio of the current of the display panel 110 and the luminance of the display panel 110 for each grayscale.

In an embodiment, the grayscale weights WT_G may be ratios of current efficiencies of grayscales to a current efficiency of the maximum grayscale. For example, the grayscales may include 0 to 225 grayscales, and the maximum grayscale may be 255 grayscale. For example, the grayscale weight WT_G of the maximum grayscale may be 1, and the grayscale weights WT_G of the grayscales other than the maximum grayscale may be less than 1.

In an embodiment, the third look-up table LUT3 may store grayscale weights WT_GW related to a current efficiency for each grayscale of white data of the image frame IFM. For example, the target current calculator 164 may multiply the grayscale values of the white data by the grayscale weights WT_GW to calculate the target current IT based on the image frame IFM.

In an embodiment, the third look-up table LUT3 may store first grayscale weights WT_GR related to a current efficiency for each grayscale of the red data of the image frame IFM, second grayscale weights WT_GG related to a current efficiency for each grayscale of the green data of the image frame IFM, and third grayscale weights WT_GB related to a current efficiency for each grayscale of the blue data of the image frame IFM. For example, the target current calculator 164 may add values obtained by multiplying grayscale values of the red data by the first grayscale weights WT_GR, values obtained by multiplying grayscale values of the green data by the second grayscale weights WT_GG, and values obtained by multiplying grayscale values of the blue data by the third grayscale weights WT_GB to calculate the target current IT based on the image frame IFM including the red data, the green data, and the blue data.

Figure 16:
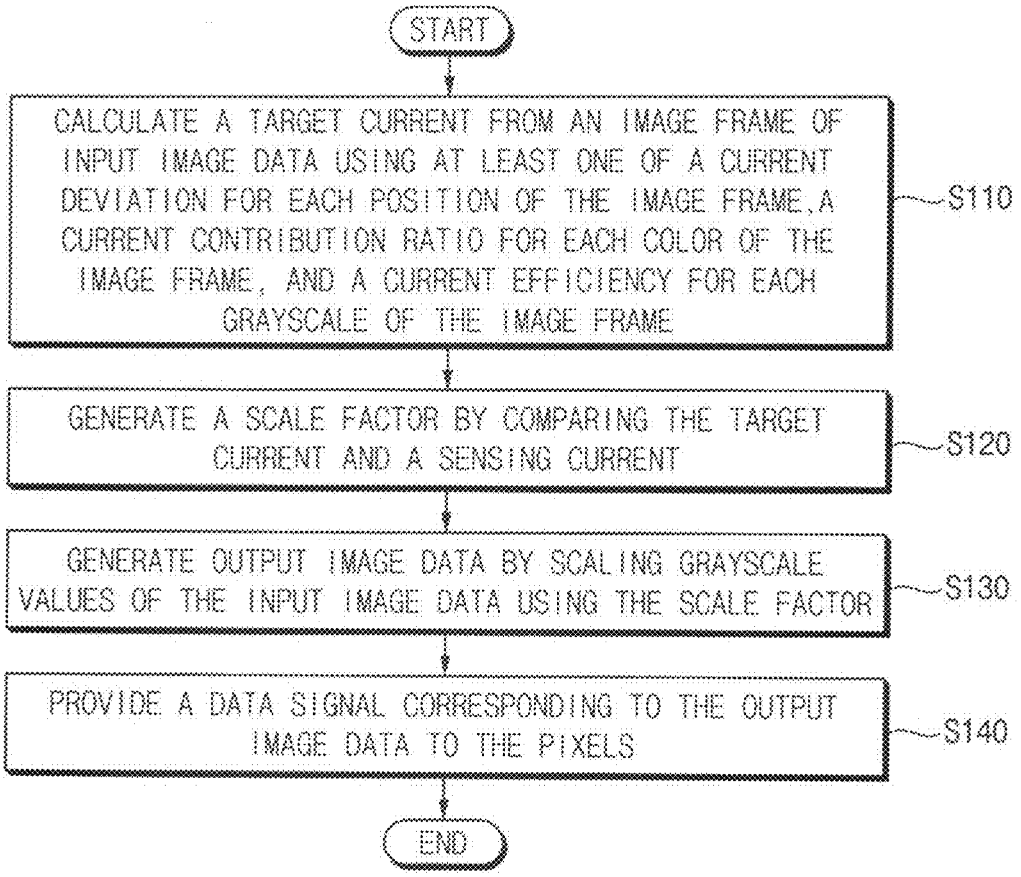
FIG. 16 is a flowchart illustrating a method of driving a display device according to an embodiment.

FIG. 16 is a flowchart illustrating a method of driving a display device according to an embodiment.

Referring to FIG. 16, the method of driving the display device may include calculating a target current from an image frame of input image data using at least one of a current deviation for each position of the image frame, a current contribution ratio for each color of the image frame, and a current efficiency for each grayscale of the image frame (S110), generating a scale factor by comparing the target current and a sensing current that flows through pixels of a display panel (S120), generating output image data by scaling grayscale values of the input image data using the scale factor (S130), and providing a data signal corresponding to the output image data to the pixels (S140).

In an embodiment, when calculating the target current (S110), the target current may be calculated, for example, from the image frame using one of position weights related to the current deviation for each position of the image frame IFM, color weights related to the current contribution ratio for each color of the image frame IFM, and grayscale weights related to the current efficiency for each grayscale of the image frame IFM. In an embodiment, when calculating the target current (S110), the target current may be calculated, for example, from the image frame using two of the position weights, the color weights, and the grayscale weights. In an embodiment, when calculating the target current (S110), the target current may be calculated, for example, from the image frame using all of the position weights, the color weights, and the grayscale weights.

In an embodiment, the position weights may include first position weights related to a current deviation for each position of red data of the image frame, second position weights related to a current deviation of green data of the image frame, and third position weights related to a current deviation for each position of blue data of the image frame. In this case, values obtained by multiplying grayscale values of the red data by the first position weights, values obtained by multiplying grayscale values of the green data by the second position weights, and values obtained by multiplying grayscale values of the blue data by the third position weights may be added to calculate a target current based on the image frame including the red data, the green data, and the blue data.

In an embodiment, the color weights may include a first color weight related to a current contribution ratio of the red data, a second color weight related to a current contribution ratio of the green data, and a third color weight related to a current contribution ratio of the blue data. In this case, a target current based on the red data, a target current based on the green data, and a target current based on the blue data may be added to calculate the target current based on the image frame including the red data, the green data, and the blue data.

In an embodiment, the grayscale weights may be grayscale weights related to a current efficiency for each grayscale of white data of the image frame. In this case, grayscale values of the white data may be multiplied by the grayscale weights to calculate the target current based on the image frame.

In an embodiment, the grayscale weights may include first grayscale weights related to a current efficiency for each grayscale of the red data, second grayscale weights related to a current efficiency for each grayscale of the green data, and third grayscale weights related to a current efficiency for each grayscale of the blue data. In this case, values obtained by multiplying grayscale values of the red data by the first grayscale weights, values obtained by multiplying grayscale values of the green data by the second grayscale weights, and grayscale values of the blue data by the third grayscale weights may be added to calculate the target current based on the image frame including the red data, the green data, and the blue data.

When generating the scale factor (S120), a ratio of the target current to the sensing current may be determined as the scale factor. For example, a scale factor less than 1 may be generated when the target current is less than the sensing current, and a scale factor greater than 1 may be generated when the target current is greater than the sensing current.

When generating the output image data (S130), the grayscale values of the input image data may increase to generate output image data when the scale factor is greater than 1, and the grayscale values of the input image data may decrease to generate output image data when the scale factor is less than 1.

Figure 17:
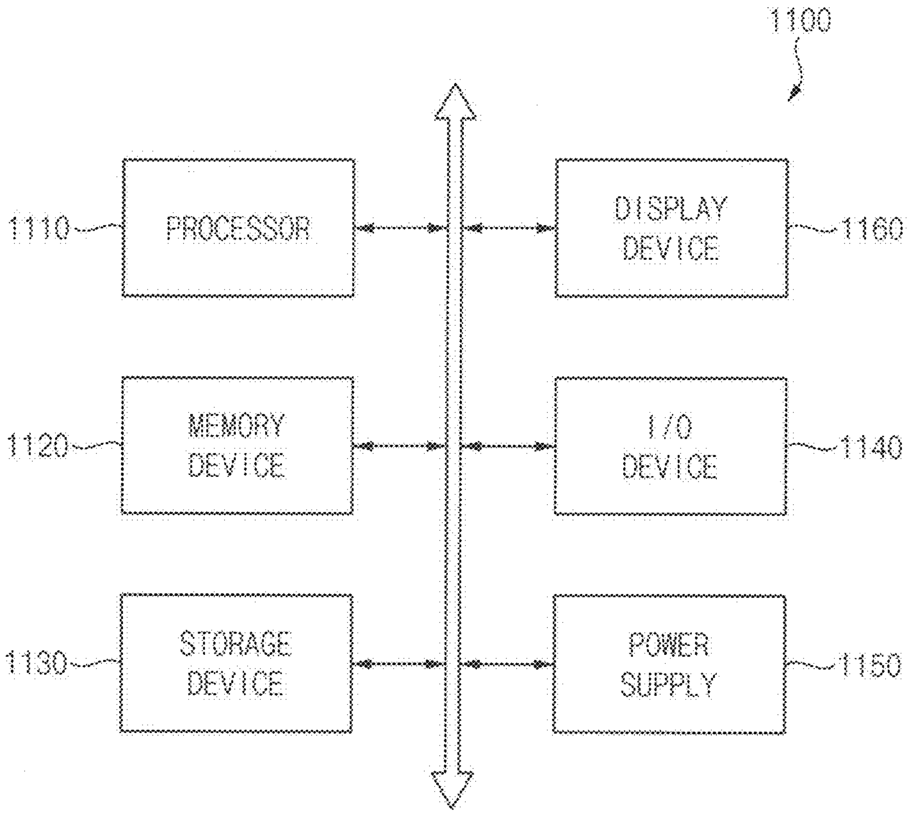
FIG. 17 is a block diagram illustrating an electronic apparatus including a display device according to an embodiment.

FIG. 17 is a block diagram illustrating an electronic apparatus 1100 including a display device 1160 according to an embodiment.

Referring to FIG. 17, the electronic apparatus 1100 may include a processor 1110, a memory device 1120, a storage device 1130, an input/output (I/O) device 1140, a power supply 1150, and a display device 1160. The electronic apparatus 1100 may further include a plurality of ports for communicating with a video card, a sound card, a memory card, a universal serial bus (USB) device, etc.

The processor 1110 may perform particular calculations or tasks. In an embodiment, the processor 1110 may be a microprocessor, a central processing unit ("CPU"), etc. The processor 1110 may be coupled to other components via, for example, an address bus, a control bus, a data bus, etc. In an embodiment, the processor 1110 may be coupled to an extended bus such as a peripheral component interconnection (PCI) bus.

The memory device 1120 may store data for operations of the electronic apparatus 1100. In an embodiment, the memory device 1120 may include a non-volatile memory device such as, for example, an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or a volatile memory device such as, for example, a dynamic random access memory ("DRAM") device, a static random access memory ("SRAM") device, a mobile DRAM device, etc.

The storage device 1130 may include, for example, a solid state drive (SSD) device, a hard disk drive (HDD) device, a CD-ROM device, etc. The I/O device 1140 may include an input device such as, for example, a keyboard, a keypad, a touchpad, a touch-screen, a mouse device, etc., and an output device such as, for example, a speaker, a printer, etc. The power supply 1150 may supply a power utilized for the operation of the electronic apparatus 1100. The display device 1160 may be coupled to other components via the buses or other communication links.

In the display device 1160, the data compensator may accurately calculate the target current, so that the image data may be accurately compensated. Therefore, the display device 1160 may display an image in which change in luminance according to change in temperature is compensated, and accordingly, a display quality of the display device 1160 may be increased.

The display device according to the embodiments described herein may be applied to a display device included in, for example, a computer, a notebook, a mobile phone, a smartphone, a smart pad, a PMP, a PDA, an MP3 player, etc.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:
- a display panel including a plurality of pixels;
- a sensor that senses a sensing current that flows through the pixels; and
- a first circuit that calculates a target current by multiplying grayscale values of an image frame of input image data by position weights related to a current deviation for each position of the image frame, and that determines a ratio of the target current to the sensing current as a scale factor.

2. The display device of claim 1, wherein the first circuit calculates the target current by further multiplying the grayscale values of the image frame by color weights related to a current contribution ratio for each color of the image frame.

3. The display device of claim 2, wherein the first circuit comprises a memory including a first table that stores the position weights related to the current deviation for each position of the image frame and a second table that stores the color weights related to the current contribution ratio for each color of the image frame.

4. The display device of claim 3, wherein the first circuit further comprises:
- a second circuit that calculates the target current by multiplying the grayscale values of the image frame by the position weights and the color weights; and
- a third circuit that generates the scale factor by comparing the target current and the sensing current.

5. The display device of claim 4, wherein the display panel is divided into a plurality of blocks, each block including at least one of the pixels, and
- wherein the position weights correspond to the blocks, respectively.

6. The display device of claim 5, wherein the position weights are ratios of currents that flow through the blocks to a reference current.

7. The display device of claim 4, wherein the position weights comprise first position weights, second position weights, and third position weights, and the first table stores:
- the first position weights,
- wherein the first position weights are related to a current deviation for each position of red data of the image frame;

the second position weights, wherein the second position weights are related to a current deviation for each position of green data of the image frame; and the third position weights, wherein the third position weights are related to a current deviation for each position of blue data of the image frame.

8. The display device of claim 4, wherein the color weights comprise a first color weight, a second color weight, and a third color weight, and the second table stores:

the first color weight, wherein the first color weight is related to a current contribution ratio of red data of the image frame;

the second color weight, wherein the second color weight is related to a current contribution ratio of green data of the image frame; and the third color weight, wherein the third color weight is related to a current contribution ratio of blue data of the image frame.

9. The display device of claim 2, wherein the image frame includes a plurality of grayscales, and wherein the first circuit calculates the target current by further multiplying the grayscale values of the image frame by grayscale weights related to a current efficiency for each grayscale of the image frame.

10. The display device of claim 9, wherein the first circuit comprises:

a memory including a first table that stores the position weights related to the current deviation for each position of the image frame, a second table that stores the color weights related to the current contribution ratio for each color of the image frame, and a third table that stores the grayscale weights related to the current efficiency for each grayscale of the image frame;

a second circuit that calculates the target current by multiplying the grayscale values of the image frame by the position weights, the color weights, and the grayscale weights; and a third circuit that generates the scale factor by comparing the target current and the sensing current.

11. The display device of claim 10, wherein the grayscale weights related to the current efficiency for each grayscale of the image frame stored in the third table includes grayscale weights related to a current efficiency for each grayscale of white data of the image frame.

12. The display device of claim 10, wherein the grayscale weights comprise first grayscale weights, second grayscale weights, and third grayscale weights, and the third table stores:

the first grayscale weights, wherein the first grayscale weights are related to a current efficiency of red data of the image frame;

the second grayscale weights, wherein the second grayscale weights are related to a current efficiency of green data of the image frame; and the third grayscale weights, wherein the third grayscale weights are related to a current efficiency of blue data of the image frame.

13. The display device of claim 10, wherein the grayscale weights are ratios of current efficiencies of grayscales to a current efficiency of a maximum grayscale.

14. The display device of claim 1, wherein the sensing current is a global current flowing through the pixels based on the image frame.

15. The display device of claim 1, further comprising:

a timing controller that generates output image data by scaling grayscale values of the input image data using the scale factor; and a data driver that provides a data signal corresponding to the output image data to the pixels.

16. A first circuit, comprising:

a memory including a first table that stores position weights related to a current deviation for each position of an image frame of input image data, and a second table that stores color weights related to a current contribution ratio for each color of the image frame; and a second circuit that calculates a target current by multiplying grayscale values of the image frame by the position weights.

17. The first circuit of claim 16, wherein the second circuit calculates the target current by further multiplying the grayscale values of the image frame by the color weights.

18. The first circuit of claim 17, wherein a display panel is divided into a plurality of blocks, each including at least one of pixels, and wherein the position weights correspond to the blocks, respectively.

19. The first circuit of claim 17, wherein the position weights comprise first position weights, second position weights, and third position weights, and the first table stores:

the first position weights, wherein the first position weights are related to a current deviation for each position of red data of the image frame;

the second position weights, wherein the second position weights are related to a current deviation for each position of green data of the image frame; and the third position weights, wherein the third position weights are related to a current deviation for each position of blue data of the image frame.

20. The first circuit of claim 17, wherein the color weights comprise a first color weight, a second color weight, and a third color weight, and the second table stores:

the first color weight, wherein the first color weight is related to a current contribution ratio of red data of the image frame;

the second color weight, wherein the second color weight is related to a current contribution ratio of green data of the image frame; and the third color weight, wherein the third color weight is related to a current contribution ratio of blue data of the image frame.

21. The first circuit of claim 17, wherein the memory further includes a third table that stores grayscale weights related to a current efficiency for each grayscale of the image frame, and wherein the second circuit calculates the target current by further multiplying the grayscale values of the image frame by the grayscale weights.

22. The first circuit of claim 21, wherein the grayscale weights related to the current efficiency for each grayscale of the image frame stored in the third table stores grayscale weights related to a current efficiency for each grayscale of white data of the image frame.

23. The first circuit of claim 21, wherein the grayscale weights comprise first grayscale weights, second grayscale weights, and third grayscale weights, and the third table stores:

the first grayscale weights, wherein the first grayscale weights are related to a current efficiency of red data of the image frame;

the second grayscale weights, wherein the second grayscale weights are related to a current efficiency of green data of the image frame; and the third grayscale weights, wherein the third grayscale weights are related to a current efficiency of blue data of the image frame.

24. The first circuit of claim 16, further comprising:

a third circuit that determines a ratio of the target current to a sensing current that flows through pixels of a display panel as a scale factor.

* * * * *